US006931564B2

(12) United States Patent (10) Patent No.: US 6,931,564 B2
Goodman et al. (45) Date of Patent: Aug. 16, 2005

(54) FAILURE ISOLATION IN A DISTRIBUTED PROCESSING SYSTEM EMPLOYING RELATIVE LOCATION INFORMATION

(75) Inventors: Brian Gerard Goodman, Tucson, AZ (US); Michael Philip McIntosh, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 09/903,705

(22) Filed: Jul. 13, 2001

(65) Prior Publication Data

US 2003/0014693 A1 Jan. 16, 2003

(51) Int. Cl.$^7$ .............................................. G06F 11/00
(52) U.S. Cl. ............................. 714/4; 714/11; 714/43
(58) Field of Search .............................. 714/4, 43, 11, 714/25, 31, 48; 370/242, 248

(56) References Cited

U.S. PATENT DOCUMENTS

| | | | | |
|---|---|---|---|---|
| 4,937,825 A | | 6/1990 | Ballard et al. ............. 371/20.1 |
| 5,023,873 A | | 6/1991 | Stevenson et al. ........... 371/8.2 |
| 5,544,150 A | * | 8/1996 | Fujimoto et al. ............ 370/248 |
| 5,727,142 A | | 3/1998 | Chen .......................... 395/181 |
| 5,862,125 A | | 1/1999 | Russ ........................... 370/228 |
| 5,884,018 A | * | 3/1999 | Jardine et al. ................. 714/4 |
| 5,941,992 A | | 8/1999 | Croslin et al. ................. 714/4 |
| 5,949,759 A | | 9/1999 | Cretegny et al. ............ 370/250 |
| 6,021,507 A | | 2/2000 | Chen ............................. 714/2 |
| 6,028,914 A | | 2/2000 | Lin et al. ...................... 379/14 |
| 6,031,819 A | | 2/2000 | Croslin ........................ 370/217 |
| 6,204,992 B1 | * | 3/2001 | Rockwell ..................... 360/92 |
| 6,304,547 B1 | * | 10/2001 | Tsuruta et al. .............. 370/224 |
| 6,545,981 B1 | * | 4/2003 | Garcia et al. ............... 370/242 |
| 6,553,515 B1 | * | 4/2003 | Gross et al. .................. 714/47 |
| 6,606,299 B1 | * | 8/2003 | Kurosawa et al. .......... 370/225 |
| 6,625,751 B1 | * | 9/2003 | Starovic et al. ............... 714/11 |
| 6,665,811 B1 | * | 12/2003 | de Azevedo et al. ........... 714/4 |
| 6,690,648 B2 | * | 2/2004 | Niida et al. .................. 370/236 |
| 6,718,480 B1 | * | 4/2004 | Ogura et al. ................... 714/4 |
| 2002/0191322 A1 | * | 12/2002 | Jerman ......................... 360/69 |
| 2003/0095504 A1 | * | 5/2003 | Ogier .......................... 370/235 |

OTHER PUBLICATIONS

Correlation of Failure Notifications, IBM Technical Disclosure Bulletin, vol. 37, No. 01, Jan. 1994.
VLSI Design of an ATM Switch With Automatic Fault Detection, Louis Chung–Yin Kwan, et al., IEEE, 1998, VI–478–VI–481.
Automatic Fault Detection, Isolation, and Recovery in Transparent All–Optical Networks, Chung–Sheng Li,et al., Journal of Lightwave Technology, vol. 15, No. 10, Oct. 1997, pp 1784–1793.
Fault Detection, Isolation, and Open Fiber Control in Transparent All–Optical Networks, Chung–Sheng Li, et al., IEEE, 1996, pp157–162.
A Failure Detection and Isolation Algorithm for a Decentralised Multisensor System, M. Fernandez, et al., IEEE, 1994, pp 27–33.

* cited by examiner

Primary Examiner—Robert Beausoliel
Assistant Examiner—Yolanda L Wilson
(74) Attorney, Agent, or Firm—John H. Holcombe

(57) ABSTRACT

Failure isolation in a distributed processing system of processor nodes coupled by a multi-drop bus network. The processor nodes have information of relative locations of the processor nodes on the network, and have an associated local error indicator, such as a character display. Each node independently tests access to other nodes on the network, and upon detecting a failure to access one or more nodes, determines, from the relative locations, the node having failed access which is closest. The failure detecting processor posts, at its associated local error indicator, an identifier of the closest failed access node. A user may inspect the local error indicators and thereby isolate the detected failure.

49 Claims, 4 Drawing Sheets

FIG. 4

| ADDRESS | LOCATION IDENTIFIER |
|---|---|
| XYCA | 01 |
| MCC1 | 02 |
| ACCA | 03 |
| OPCA | 04 |
| MCC2 | 05 |
| OPCB | 06 |
| ACCB | 07 |
| MCC3 | 08 |
| XYCB | 09 |
| — | 80 |

FIG. 5

| ADDRESS | LOCATION ID | FRAME |
|---|---|---|
| XYCA | 28 | 01 |
| MCC1 | 25 | 01 |
| ACCA | 27 | 01 |
| OPCA | 26 | 01 |
| MCC2 | 25 | 02 |
| OPCB | 26 | 03 |
| ACCB | 27 | 03 |
| MCC3 | 25 | 03 |
| XYCB | 28 | 03 |
| — | 29 | 80 |

FIG. 6

| ADDRESS | LOCATION ID | FRAME | PRIORITY |
|---|---|---|---|
| MCC1 | 25 | 01 | 00 |
| OPCA | 26 | 01 | 00 |
| ACCA | 27 | 01 | 01 |
| XYCA | 28 | 01 | 00 |

FAILURE ISOLATION IN A DISTRIBUTED PROCESSING SYSTEM EMPLOYING RELATIVE LOCATION INFORMATION

FIELD OF THE INVENTION

This invention relates to distributed processing systems having a plurality of processor nodes, for example, in control systems, and, more particularly, to isolation of failures in distributed processing systems having a plurality of processor nodes coupled by a multi-drop bus network.

BACKGROUND OF THE INVENTION

In a system having a plurality of processor nodes, it becomes difficult to isolate failures. As pointed out, e.g., by U.S. Pat. No. 6,031,819, a failure detector and alarm may be provided at each node of a system to detect and isolate a failure, with the result that failure isolation is expensive. An alternative method is to provide a detailed map of the system and provide specific diagnostic routines to run on the system, but may require an external device such as a laptop, with special purpose software or hardware to communicate with the specific processors and aid in the diagnosis. In a distributed control system, such as is employed in an automated data storage library, the processor nodes may comprise a microprocessor and a non-volatile memory. Thus, the routines may be maintained on an external processor, such as a laptop PC, having a connector cable and diagnostic software, and the routines must be tailored to the specific configuration of processors of the distributed control system. The user must be familiar with the emulator software, and the diagnostic routines must be able to run over the emulator software. Further, the diagnostic routines must be supported to respond to changes in the underlying distributed processing system over time.

Such diagnostic routines can only locate "hard" failures, which still occur at the time that the diagnostic routines are being run. Failures that occur involving communication across a network, such as a multi-drop bus network, may be intermittent, so it is difficult for such diagnostic routines to locate and diagnose the failures. One example of such a failure comprises a loose pin which occasionally makes contact and occasionally comprises an open circuit.

Diagnosis of such failures therefore requires service cost to bring a trained user with an external processor to the system, to conduct the diagnostics, and to isolate and locate the failures. The system may be down, or may be unreliable, for the duration of the time between the first occurrence of a failure and the isolation, location and repair of the failure.

SUMMARY OF THE INVENTION

An object of the present invention is to isolate failures in a distributed processing system without a requirement for external diagnostics.

Another object of the present invention is to preserve information which allows the isolation of intermittent failures.

Disclosed are distributed processing systems, methods, computer program products, nodes of processing systems, and an automated data storage library, for isolating failures in distributed processing systems comprising processor nodes coupled by multi-drop bus networks.

Each of a plurality of the processor nodes has information determining relative locations of the processor nodes on the multi-drop bus network, and is associated with a local error indicator. The plurality of processor nodes each independently tests access to other processor nodes on the multi-drop bus network. Upon a testing processor node detecting a failure to access at least one of the other processor nodes, the failure detecting processor node determines, from the provided information of relative locations, the processor node having failed access which is closest to the failure detecting processor node. In one alternative, the testing processor nodes test access to all the other processor nodes. In another alternative, each of the testing processor nodes tests access to its adjacent node or nodes. At a minimum, at least one of the processor nodes must test access to a plurality of other nodes. The failure detecting processor node stores and subsequently posts, at its associated local error indicator, an identifier of the closest processor node having failed access. A user may inspect the local error indicators and thereby isolate the detected failure, even though the failure may have been intermittent.

In one embodiment, the local error indicator comprises a character display, such as an LED or an LCD display of at least one character.

Additionally, upon the access testing by any of the plurality of testing processor nodes detecting a failure to access all of the other processor nodes, the failure detecting processor node posts a special identifier at the associated local error indicator. Thus, the user is provided a special identifier which indicates that the detected failure may be at the inspected processor node.

As the result, a user is able to examine the local error indicators and isolate the access failure, and to conduct repairs without a requirement for external diagnostics.

Alternatively, an error message representing the identifier is posted to an error log; and, subsequently, the posted error messages of the plurality of processor nodes may be accumulated. Thus, the accumulated error messages may be analyzed at a convenient time, allowing the user to isolate and repair multiple intermittent failures.

For a fuller understanding of the present invention, reference should be made to the following detailed description taken in conjunction with the accompanying drawings.

BRIEF DESCRIPTION OF THE DRAWINGS

FIG. 4 is a diagrammatic representation of an embodiment of a table of relative locations of the distributed processing system of FIGS. 1 and 3 in accordance with the present invention;

FIG. 5 is a diagrammatic representation of an alternative embodiment of a table of relative locations of the distributed processing system of FIGS. 1 and 3;

FIG. 6 is a diagrammatic representation of an embodiment of a table of relative locations of the distributed processing system of FIG. 2 in accordance with the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
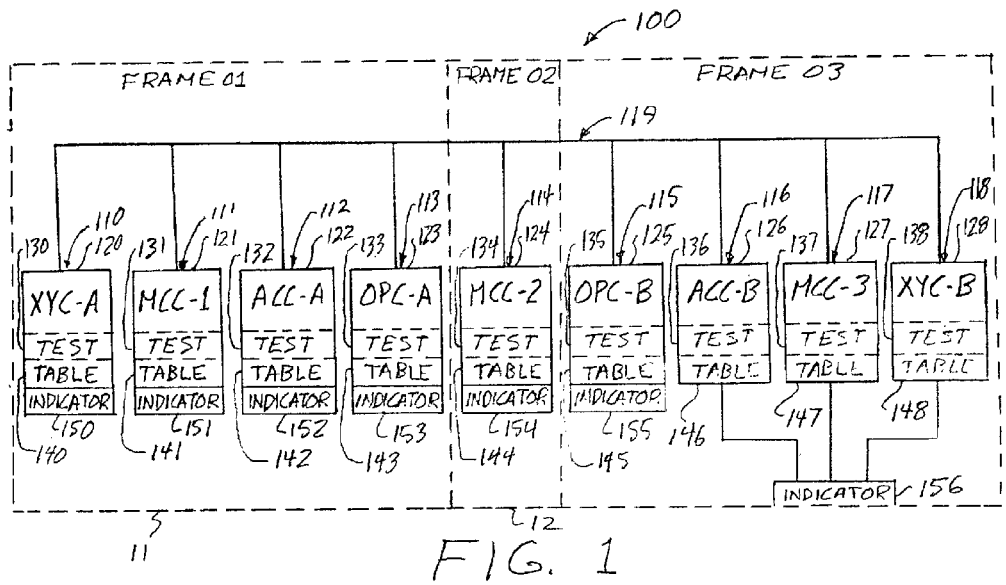
FIG. 1 is a block diagram of an embodiment of a distributed processing system comprising processor nodes coupled by a multi-drop bus network implementing the present invention.

Referring to FIG. 1, an embodiment of a distributed processing system 100 is illustrated comprising processor nodes 110–118 coupled by a multi-drop bus network 119. Examples of multi-drop bus networks are a CAN bus network, twin lead Ethernet network, or SCSI network, as are known to those of skill in the art. As is also known to those of skill in the art, the multi-drop bus network comprises any appropriate cabling, connections, interfaces, code, etc. Herein, a multi-drop network refers to any communication network where a break in the communication lines causes one or more subsequent communication failures. In accordance with the present invention, the processor nodes 110–118 comprise a processor 120–128, which may comprise special logic circuits or a microprocessor, for example, of the type commercially available from Intel or AMD, as is known to those of skill in the art. The processor nodes additionally comprise a memory for storing computer readable program code 130–138 usable with the processor for testing access to other processors, and for storing information, for example, in a table 140–148 providing relative locations of the processor nodes on the multi-drop bus network. The memory, for example, comprises a nonvolatile memory, such as an NVRAM commercially available from Intel or AMD, or an EEPROM or flash memory, as is known to those of skill in the art. Local error indicators 150–156 are associated with one or more processor nodes for posting an identifier of a processor node at which the tested access failed. The local error indicator preferably comprises a character display, such as an LED or an LCD, which displays one or more individual characters, such as numeric, alphanumeric, and/or special characters. An alternative embodiment of a local error indicator comprises a flashing LED and counter which provides a numerical output by means of a sequence of flashes. Such indicators are known to those of skill in the art.

In one embodiment, the local error indicator is directly associated with and coupled to a single processor node, such as local area indicators 150–153 and processor nodes 110–113. In another embodiment, more than one of the processor nodes are each uniquely associated with and coupled to a single local area indicator, such as processor nodes 116–118 and local area indicator 156. In a preferred embodiment, the local error indicator 156 provides a separate indication for each processor node, either by having multiple displays or by sequentially displaying the indications. In an alternative embodiment, a priority algorithm may select the error indication for display.

In any embodiment, the local error display may be mounted at or near the processor node, or alternatively may be remotely mounted, for example, on the frame structure.

The multi-drop bus network 119 of FIG. 1 is arranged in a sequence of drops to each processor node 110–118, such that any one node is located adjacent at least one other processor node in the drop sequence, similar to a daisy-chain. Thus, for example, processor node 110 is adjacent processor node 111, and processor node 111 is adjacent processor node 110 in one direction and adjacent processor node 112 in the other direction. Processor nodes 113–118 are progressively further away from processor nodes 110 and 111.

In accordance with the present invention, upon a failure of access between processor node 111 and processor node 112, such that neither processor node 110 nor processor node 111 are able to access any of processor nodes 112–118, both processor node 110 and processor node 111 will indicate that the failure of access is at the closest processor node having failed access, which is processor node 112. Similarly, processor nodes 112–118 are unable to access either of processor nodes 111–110, and all of the processor nodes 112–118 will indicate that the failure of access is at the closest processor node having failed access, which is processor node 111. As will be discussed, upon each of the processor nodes 110–118 posting, at an error indicator 150–156 local to the failure detecting processor node, an identifier of the closest processor node having failed access, an examination of the local error indicators quickly allows a user to isolate the failure to a point between processor node 111 and processor node 112.

Additionally, upon the access testing by any of the plurality of testing processor nodes detecting a failure to access all of the other processor nodes, the failure detecting processor node posts a special identifier at the error indicator. Thus, the user is provided a special identifier which indicates that the detected failure may be at the inspected processor node. For example, upon a failure of access at processor node 112, such that none of processor nodes 110, 111 nor processor nodes 113–118 are able to access processor node 112, all of the processor nodes 110, 111, and 113–118 will indicate that the failure of access is at the closest processor node having failed access, which is processor node 112. Processor node 112 is unable to access any of the other processor nodes 110, 111, and 113–118, and posts the special identifier. As will be discussed, upon each of the processor nodes 110–118 posting, at an error indicator 150–158 local to the failure detecting processor node, an identifier of the closest processor node having failed access or the special identifier, an examination of the local error indicators quickly allows a user to isolate the failure to processor node 112.

Figure 2:
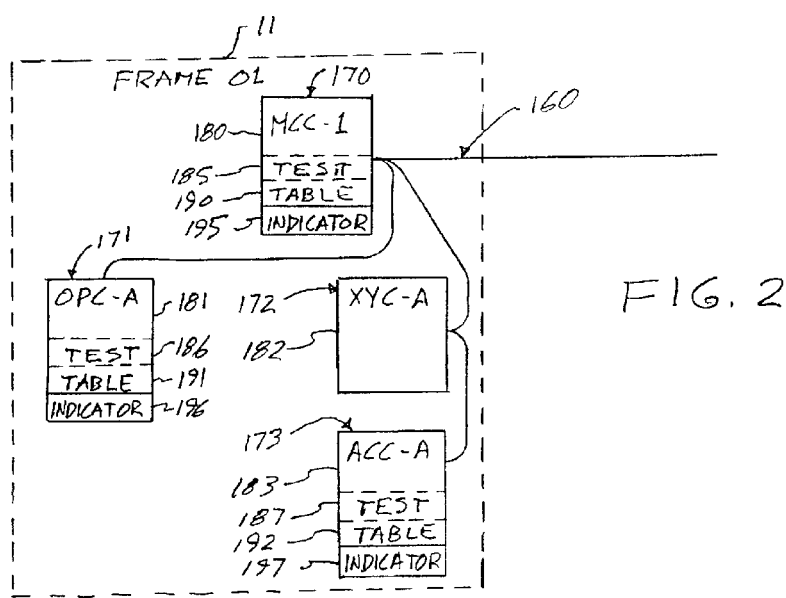
FIG. 2 is a block diagram of an alternative embodiment of the distributed processing system of FIG. 1.

An alternative arrangement of a multi-drop bus network 160 is illustrated in FIG. 2, in which a plurality of nodes are at an equal location, and in which the drops are tiered or cascaded, providing multiple processor nodes of the multi-drop bus network. Processor nodes 170–172 may be considered to be at an equal location, and processor node 173 is cascaded or tiered from processor node 172, comprising multiple processor nodes. Upon multiple failures at the multiple processor nodes, the present invention selects a predetermined one of the multiple processor nodes 170–172 and/or 172, 173 to identify the closest processor node in the sequence. One way of providing the predetermined selection is to identify one of the multiple processor nodes as having a higher priority than other processor nodes. For example, processor node 172 is identified as having the higher priority than equal location processor nodes 170, 171, and than tiered processor node 173. The selection then comprises selecting the multiple processor node 172 as having the higher priority. Herein, equal location processor nodes and/or tiered processor nodes are defined as multiple processor nodes.

As discussed above with respect to FIG. 1, the processor nodes 170–173 of FIG. 2 each comprises a processor 180–183. In order to provide precise isolation, it is preferred that each of the processor nodes 110–118 and 170–173, conduct the access testing of the present invention and provide the identifier of the closest processor node having failed access. However, the invention remains workable in the event one or more of the processor nodes, such as processor node 172, is not provided with the computer readable program code, table, or local error indicator.

In the example depicted in FIG. 2, processor nodes 170, 171 and 173 additionally comprise a memory for storing computer readable program code 185–187, usable with the processor for testing access to other processors, and for storing a table 190–192 determining relative locations of the processor nodes on the multi-drop bus network. The processor nodes 170, 171 and 173 additionally each comprises a local error indicator 195–197 for posting an identifier of a processor node at which the tested access failed. Thus, processor node 172, without the programmable code, etc., will not test for, and will not provide any indication of, a failed access. However, the identifiers of each of the other processor nodes will still allow a user to quickly isolate the failed access.

Each of the processors 120–128, of FIG. 1, and 180, 181 and 183 of FIG. 2 is provided with computer readable program code usable with the processor for operating in accordance with the present invention. The program code may comprise one or more program products, and may be supplied with an application program and stored in a provided memory, may be supplied with a diskette or CD-ROM at a terminal, or may be implemented in a PROM, and comprise an article of manufacture, or may be received from the network, or may be received or implemented by other similar means. The requirement for the memories are that they store digital representations of computer executable instructions. The computer readable program code operates associated devices, such as the local error indicator, and tests the associated bus network, through the computer processor or processors.

Figure 3:
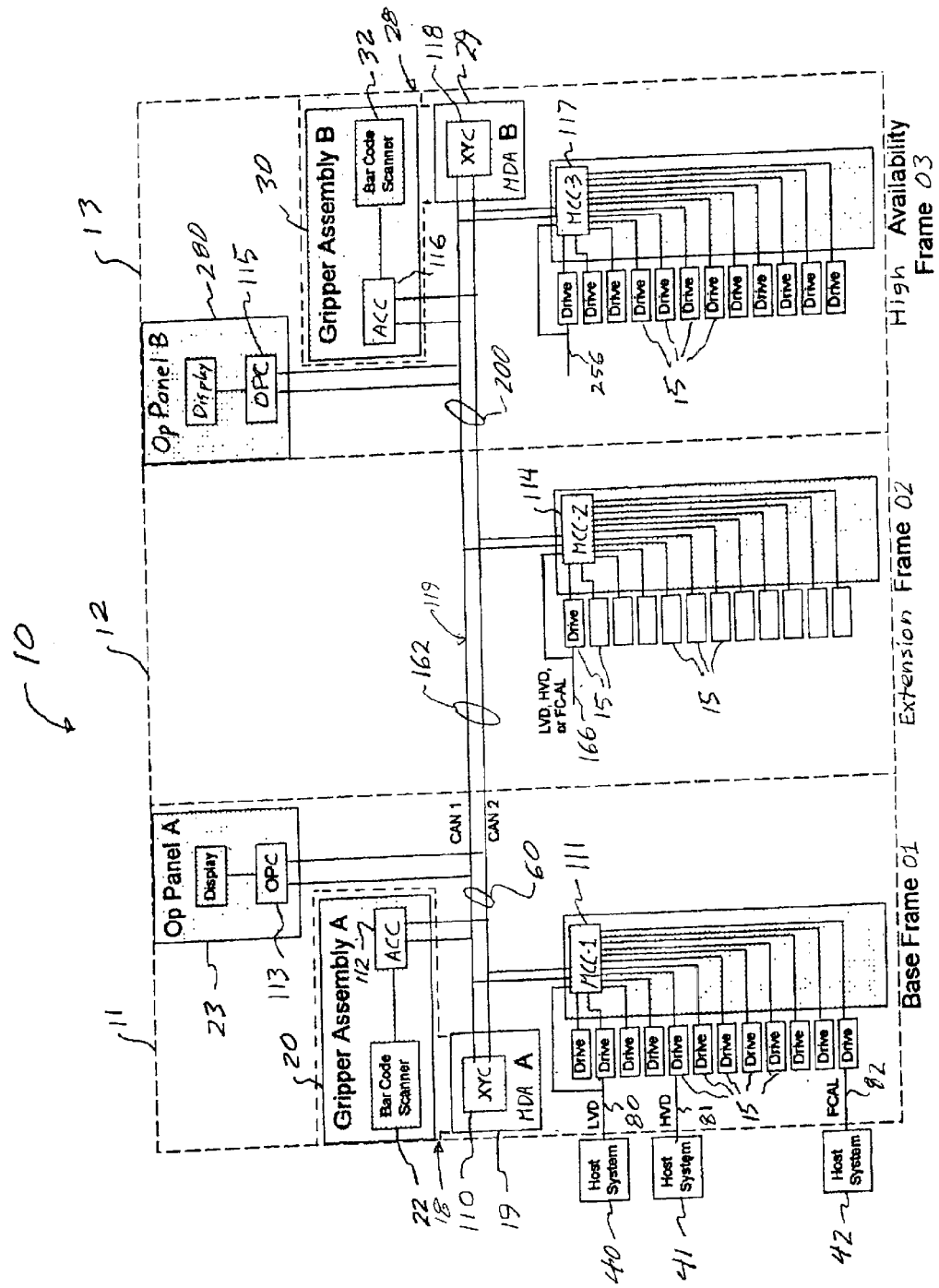
FIG. 3 is a block diagram of an automated data storage library implementing the distributed processing system of FIG. 1.

FIG. 3 illustrates an embodiment of an automated data storage library 10 implementing the distributed processing system of FIG. 1. The automated data storage library stores and retrieves data storage media stored in storage shelves. An example of an automated data storage library which may implement the present invention is the IBM 3584 tape library. The automated data storage library comprises a base frame 11, may additionally comprise one or more extension frames 12, and may comprise a high availability frame 13.

The base frame 11 of the library 10 comprises one or more data storage drives 15, and an accessor 18. The accessor 18 includes a gripper assembly 20, a motor driver system 19, and may include a bar code scanner 22 or reading system, such as a smart card reader or similar system, mounted on the gripper 20, to "read" identifying labels on the data storage media. The data storage drives 15, for example, may be optical disk drives or magnetic tape drives, and the data storage media may comprise optical or magnetic tape media, respectively, or any other removable media and associated drives, or removable data storage device. The automated data storage library may also comprise an operator panel 23 or other user interface, such as a web-based interface, which allows a user to interact with the library.

The extension frame 12 comprises additional storage shelves, and may comprise additional data storage drives 15 and/or an operator panel. The high availability frame may also comprise additional storage shelves and data storage drives 15, and comprises a second accessor 28, which includes a gripper assembly 30, a motor driver assembly 29, and may include a bar code scanner 32 or other reading device, and an operator panel 280, or other user interface. In the event of a failure or other unavailability of the accessor 18, or its gripper, etc., the second accessor 28 may take over or may be operational in reduced performance mode.

Still referring to FIG. 3, the accessors 18, 28 each comprises a motor driver system 19, 29 operated by an XY processor node 110, 118. The motor driver systems 19, 29 have servo motors for, e.g., moving the associated accessor in the X direction and the gripper in the Y direction. In some libraries, the X direction is a straight horizontal direction, with storage shelves for the data storage media and the data storage drives arranged in columns and rows on one or both sides of the accessor, and in others, the X direction is a circumferential horizontal direction, with the storage shelves and drives arranged around a cylinder, and in both, the Y direction is vertical. The grippers 20, 30 each are operated by an accessor processor node 112, 116 to put and release, or to retrieve and grip the data storage media at the storage shelves and to load and unload the data storage media at the data storage drives 15. As is understood by those of skill in the art, a garage area may be provided for storage of accessor 18, and high availability frame 13 may either have a garage area or be without storage shelves or data storage drives to provide storage of accessor 28.

Referring to FIG. 3, the library 10 receives commands from one or more host systems 40, 41 or 42. The host systems, such as host servers, communicate with the library, either directly, e.g., on path 80, or through one or more data storage drives 15, providing commands to access particular data storage media and move the media, for example, between the storage shelves and the data storage drives. The commands are typically logical commands identifying the media and/or logical locations for accessing the media.

The library is controlled by a distributed control system for receiving the logical commands and converting the commands to physical movements of the accessor 18, 28 and gripper 20, 30, and for operating the servo motors in accordance with the desired physical movements. The distributed control system may also provide the logistical support, such as responding to host requests for element status, inventory, library status, etc. The specific commands, the conversion of those commands to physical movements, and the operation of the servo motors are known to those of skill in the art and will not be repeated here.

The distributed control system comprises a communication processor node MCC-1 111 in the base frame 11. The communication processor node provides a communication link for receiving the host commands, either directly or from the drives 15. The communication processor node 111 may additionally provide a communication link for operating the data storage drives 15. The accessor processor node ACC-A 112 is coupled to the communication processor node 111 by means of the multi-drop bus network 119. The accessor processor node is responsive to the linked commands, and operates the gripper 20 and provides X and Y move commands. The accessor processor node 112 is preferably located at the accessor 18, and may be mounted at the gripper 20, for operating the gripper. The XY processor node XYC-A 110 may be located at the motor driver system 19 of the accessor 18. The XY processor node 110 is coupled to the accessor processor node 112 by means of the multi-drop bus network 119, and may be responsive to the X and Y move commands of the accessor node, operating the servo motors of the motor driver system 19. Also, an operator panel processor node OPC-A 113 is provided at the operator panel 23 for providing an interface for an operator to communicate over the multi-drop bus network 119 between the operator panel and the communication processor node 111, the accessor processor node 112, and the XY processor node 110.

As discussed in coassigned U.S. patent application Ser. No. 09/573,531, the multi-drop bus network 119 may comprise a common bus 60 of frame 11, coupling the communication processor node 111 to the accessor processor node 112, and coupling the accessor processor node 112 to the XY processor node 110. The operator panel processor node 113 may also be coupled to the common bus 60. The illustrated example of the multi-drop bus network comprises the commercially available "CAN" bus system, which has a standard access protocol and wiring standards, for example, as defined by CiA, the CAN in Automation Association, Am Weich selgarten 26, D-91058 Erlangen, Germany.

In one embodiment, processor nodes 110–113 may comprise sequential locations at separate drops of the multi-drop bus network 119. In an alternative embodiment, common bus 60 comprises a single drop of the multi-drop bus network 119, or equivalent, and processor nodes 110–113 comprise an equal relative location.

As is known to those of skill in the art, various communication arrangements may be employed for communication with the hosts and with the data storage drives. In the example of FIG. 3, host connections 80 and 81 are SCSI busses. Busses 80 and 81 may comprise versions of a SCSI bus that provides each data bit on its own twisted pair of wires in the bus cable. Bus 82 comprises an example of a fibre channel arbitrated loop which is a high speed serial data interface, allowing transmission over greater distances than the SCSI bus systems. In the illustrated example, the data storage drives 15 are in close proximity to the communication processor node 111, and may employ a short distance communication scheme, such as SCSI, or a serial connection, such as RS-422 or RS-232.

Still referring to FIG. 3, an extension frame 12 is provided with an extension common bus 162, which is coupled to the base frame common bus 60, forming a continuation to the multi-drop bus network 119. Another communication processor node 114 may be located in the extension frame and may communicate with hosts and/or with any data storage drives 15 in frame 12, e.g., at input 166. Thus, commands from hosts may be received either directly or via the data storage drives. The communication processor node 114 is coupled to the extension common bus 162, the communication processor node providing a communication link for the commands and data to the extension common bus, so that the commands are linked to the base frame common bus 60 and to the accessor processor node 112.

Additional extension frames with identical communication processor nodes 114, storage shelves, data storage drives 15, and extension busses 162, may be provided and each is coupled to the adjacent extension frame.

As discussed above, various processor nodes in any extension frame 12 may comprise different relative locations, or the common bus 162 may comprise an equal relative location for multiple processor nodes.

Further, referring to FIG. 3, the automated data storage library 10 may additionally comprise another accessor 28, for example, in a high availability frame 13. The accessor 28 may comprise a gripper 30 for accessing the data storage media, and a motor driver system 29 having servo motors, for example, for moving the accessor in the X direction and the gripper in the Y direction. The high availability frame may be adjacent to an extension frame 12, or adjacent the base frame 11, and the accessor 28 may run on the same path as accessor 18, or on an adjacent path. The high availability frame 13 may also have an operator panel 280. The distributed control system may additionally comprise an extension common bus 200 of the multi-drop bus network 119 coupled to the extension common bus 162 of an extension frame or to the common bus 60 of the base frame. Another communication processor node 117 may be provided, located in the high availability frame 13 for receiving commands from hosts, either directly or via data storage drives 15, e.g., at input 256. The communication processor node is coupled to the high availability frame extension common bus 200, providing a communication link for the commands and data to the extension common bus. An accessor processor node ACC-B 116 is located at the other accessor 28, coupled to the high availability frame extension common bus 200. Any processor node of the high availability frame may be programmed to determine if the base frame accessor 18 is unavailable, and, in the event the base frame accessor is unavailable, to activate the accessor 28. As is known to those of skill in the art, garage areas should be provided for any inactive accessor to allow access by the active accessor to all storage shelves and data storage drives. Alternatively, both accessors may be operated simultaneously, as is known to those of skill in the art, to provide higher performance.

The accessor processor node 116, when the accessor 28 is activated, is responsive to the linked commands of the communication processor nodes, and may operate the gripper 30 and provide X and Y move commands, both in exactly the same manner as the accessor processor node 112. An XY processor node XYC-B 118 at the motor driver system 29 is coupled to the high availability frame extension common bus 200 of the multi-drop bus network 119, and is responsive to the move commands of the accessor processor node 116, operating the servo motors.

An operator panel processor node OPC-B 115 is provided at the operator panel 280 for providing an interface for the operator. The operator can communicate over the multi-drop bus network 119 between the operator panel and the communication processor node 117, the accessor processor node 116, and the XY processor node 118.

In this manner, the multi-drop bus network 119 of FIG. 1 provides communication between each of the processor nodes 110–118 as implemented in the data storage library 10 of FIG. 3. In the illustration of FIGS. 1 and 3, the multi-drop bus network is implemented with the processor nodes in a sequence, and, alternatively, common busses 60, 162 and 200 each comprises an equal relative location.

Referring additionally to FIG. 2, the alternative arrangement of a multi-drop bus network 160 may also be implemented in the automated data storage library of FIG. 3. As illustrated in FIG. 2, the network implementation is shown in base frame 11, and the drops are tiered or cascaded as well as in an equal relative location, providing multiple processor nodes. Processor nodes 170–172 may be considered to be in an equal relative location, and processor node 173 is cascaded or tiered from processor node 172, comprising multiple processor nodes.

Figure 7:
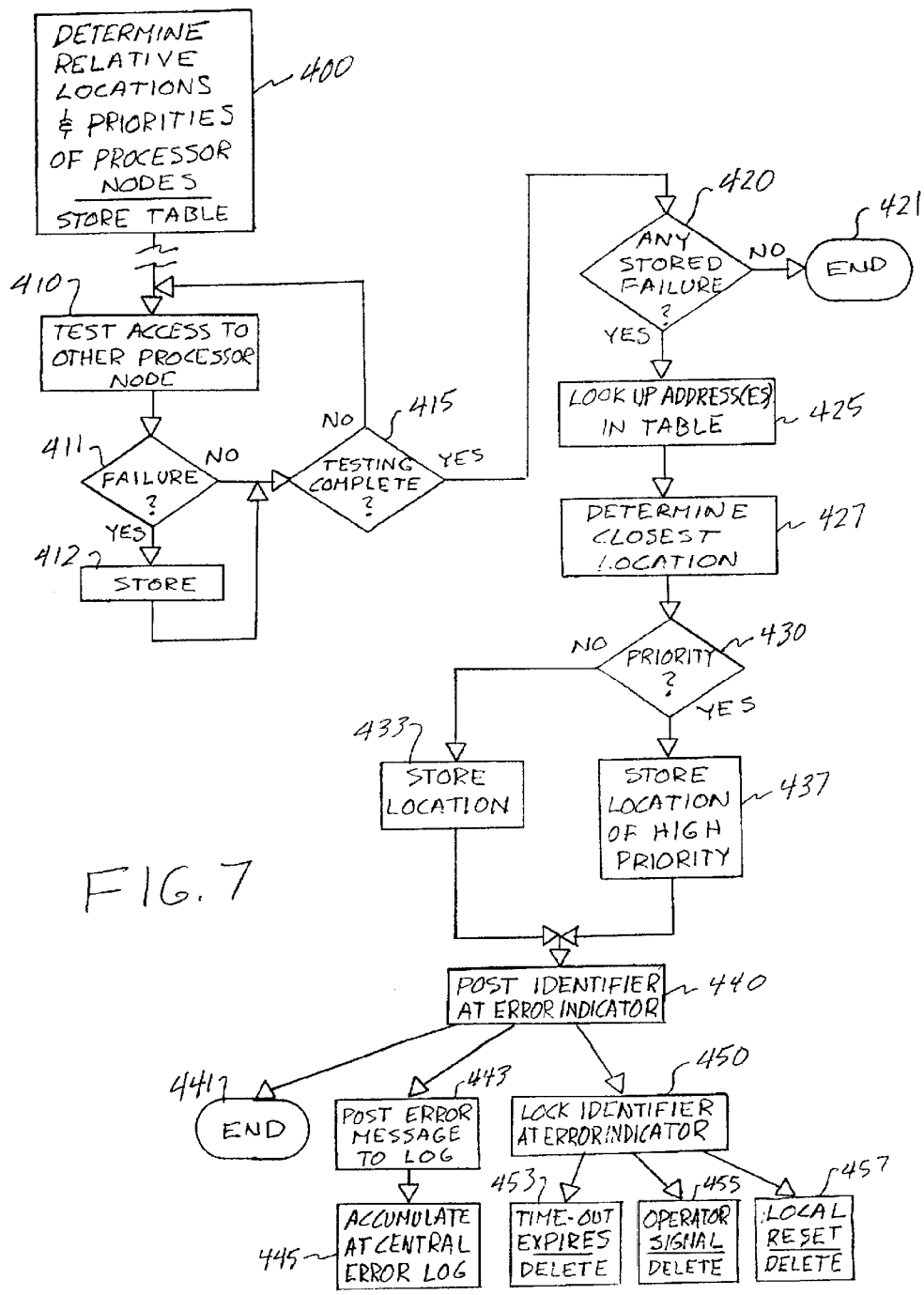
FIG. 7 is a flow chart depicting an embodiment of a computer implemented method in accordance with the present invention.

In accordance with the present invention, the first step of the method for isolating failures comprises each of a plurality of the processor nodes determining the relative locations of the processor nodes on the multi-drop bus network. Examples of information, such as tables, which provide the relative locations of the processor nodes are illustrated in FIGS. 4–6. Referring additionally to FIG. 7, the tables are provided in step 400, for example, by an entry by a user at initialization of the system. The entry may be made at an operator panel 23 or 280, or may be provided from a host system, and is replicated across each of the processor nodes and stored by the processor of the node in the memory. Alternatively, step 400 may comprise part of an update to the system when modules are added, upgraded or replaced, or of an automatic configuration, or of set-up.

The provided information, e.g., of the tables of FIGS. 4–6, may comprise specific bus addresses or device numbers for the processor nodes, or alternatively may comprise ranges of addresses or numbers.

Herein, the provided information, or table, refers to any storage arrangement, such a tables, structures, variables, registers, or arrays, and may be single or multiple combinations of these.

Table 300 of FIG. 4 represents an example of provided information of relative locations of the processor nodes, comprising a direct sequential numbering of the processor nodes. The processor nodes are represented by their bus addresses 303, and are not necessarily as represented in the illustrated table. For example, the addresses are standardized addresses for the particular multi-drop bus network, such as LUN addresses for a SCSI bus network. Each of the processor nodes, for example, processor nodes 110–118 of FIG. 1 are depicted, is arranged in sequence, and is assigned a location identifier 305 which is in numerical sequence, from one end of the multi-drop bus network, e.g., network 119, to the opposite end of the network. Thus, any of the processors, knowing its own address, when detecting unavailable processor nodes, can easily use the list sequence to determine from the provided relative locations of the list sequence, the processor node 303 having failed access which is closest to the failure detecting processor node. Once the closest processor node for which access failed has been determined, the failure detecting processor node stores an identification of the location of that closest node, and subsequently posts, at its associated local error indicator, the identifier 305 of that closest processor node. The stored identification and the identifier may be identical, or, alternatively, the stored identification may be more extensive. When encoded in the memory of the processor node, the table may take any suitable form, such as a sequential listing, as is known to those of skill in the art.

A special identifier 309 is provided, e.g., "80", so that upon the access testing by the testing processor node detecting a failure to access all of the other processor nodes, the failure detecting processor node posts the special identifier 309 at the associated local error indicator. For example, in FIG. 1, upon a failure of access at processor node 112, such that processor node 112 is unable to access any of the other processor nodes 110, 111, and 113–118, processor node 112 posts the special identifier 309.

Table 310 of FIG. 5 represents an alternative identification arrangement for the provided information of relative locations. Again, each of the processor nodes, for example, processor nodes 110–118 of FIG. 1 are depicted, is arranged in sequence by its address 313, from one end of the multi-drop bus network, e.g., network 119, to the opposite end of the network. Each of the processor nodes is assigned a location identifier 315 which comprises an identification 316 of the type of processor node, and an identification 317 of the frame of the library in which the processor node is located. The local error indicator is preferably a character display, and, if displaying four characters, the failure detecting processor node posts, at its local error indicator, both the type identifier 316 and the frame identifier 317 of the closest processor node for which access failed. If the local error indicator is a two character display, the display must store the characters and alternately display the type identifier 316 and the frame identifier 317. In the example of the table of relative locations of FIG. 5, a code of "25" indicates a communication processor node, a code of "26" indicates an operator panel processor node, a code of "27" indicates an accessor processor node, and a code of "28" indicates an XY processor node.

The special identifier 319 comprises both a special type code, e.g., code "29" and a special frame code "80".

Table 320 of FIG. 6 represents the identification information for the relative processor node locations of table 310 of FIG. 5 as implemented for the multiple processor nodes of the multi-drop bus network implementation 160 of FIG. 2 for the processor nodes of frame 11 of the library of FIG. 3. The change comprises noting that, in the implementation of FIG. 2, processor nodes MCC-1 170, processor node OPC-A 171, and processor node XYC-A 172 are at an equal relative location. Processor node ACC-A 173 is cascaded or tiered from processor node XYC-A 172, comprising multiple processor nodes on the same drop of multi-drop bus network 160. In the example, the addresses 323, the locations 325, the identifiers 326 and frame identifiers 327 are the same as discussed above with respect to FIG. 5. However, to allow a display of an identifier of a single processor node in the event of multiple failures, a relative priority 328 is provided for the multiple processor nodes 170–173. In the illustrated example, processor node ACC-A 173 has the higher priority. Thus, upon the access testing by a testing processor node detecting a failure to access both processor node 172 and 173, the processor node selects the identifier for the higher priority processor node for display at the local error indicator, which, in the example, is processor node 173, identified as "27-01", comprising the type identifier from column 326 and the frame number from column 327.

Referring to FIG. 7, step 400 is conducted once, and the access testing, beginning at step 410, is conducted periodically or at any idle time for a processor node. Alternatively, the test may be triggered by a failure within the node, which may be due to external or internal factors. The access test step 410 comprises, at each processor node having the test code, attempting an access to one or more of the other processor nodes, employing the address of the node, such as the address 303 of table 300 of FIG. 4. In one alternative, the testing processor nodes test access to all the other processor nodes. In another alternative, each of the testing processor nodes tests access to the adjacent processor node or nodes. For example, a processor node at an end of a bus may only have one adjacent processor node. The testing processor nodes may comprise a mixture of tests, but, at a minimum, at least one of the processor nodes must test access to a plurality of other processor nodes. The accesses are done sequentially, or alternatively as a broadcast if the network allows. The accessed processor node will either respond, in which case the access test was successful, or it will not respond, which is a failure. Step 411 determines whether the test was a failure, "YES", in which case the test failure is stored in the memory in step 412, or the test was successful, "NO". As an example, processor node 112 of FIG. 1 tests access to the other processor nodes, employing the test code 132, beginning in step 410 by testing access to processor node 110. If a failure is detected in step 411, the failure is stored in memory in step 412 in an area provided by the test code 132. The detected failure may be a single event, or may comprise more than one communication error. In addition, the detected failure may be total loss of communication or may comprise other transmission errors, e.g., parity errors.

Upon completion of the access test and storage of any failure, step 415 determines whether all of the other processor nodes have been tested. If not, step 415 cycles the process back to step 410 to test access to the next processor node. As an example, in FIG. 1, processor node 112, subsequent to the test of access to processor node 110, cycles back to step 410 to test access to processor node 111. If that test also detects a failure, that failure is stored in memory in step 412 employing the test code 132.

Still referring to FIG. 7 and the example of FIG. 1, the testing by processor node 112 continues with respect to processor nodes 113–118. Step 415 then indicates that the testing is complete, leading to step 420, which determines whether any failure is stored in the memory. If not, "NO", all connections are operational, and the test ends at step 421, and, after some delay to prevent overload of the network, a new test begins at step 410.

Step 411–415 alternatively may be modified to produce the same end result. For example, the testing processor may test nodes from the furthest locations first and store any failures, overwriting any previous failure, such that each time through the test, results in another node being stored as the failed node until the process ends with the closest failing node being the last stored.

If there is a stored failure, step 420 leads to step 425 in which the addressees) of the stored failure(s) is (are) looked up in the table of relative locations. In the above example, the stored failures comprise failure by processor node 112 to access processor nodes 110 and 111. In step 427, the processor 122 determines from its table of relative locations 142, e.g., table 300 in FIG. 4, the processor node having failed access which is closest to the failure detecting processor node. In the instant example, processor 122 determines, as between processor node 110 and processor node 111, that processor node 111 is closest to the testing processor node 112.

In step 430, the processor determines whether the processor node closest to the testing processor node has a priority indication, e.g., in column 328 of table 320 of FIG. 6. In the instant example, the arrangement of the multi-drop bus network is that of FIG. 1, such that there is no priority listing for the closest processor node having failed access 111. Thus, the process proceeds to step 433 and the processor stores the location identifier of the closest failing processor node in the memory area. In the instant example, the location identifier from table 300 of FIG. 4 for processor node MCC-1 111 is "02", and the identifier is stored. In the alternative example of table 310 of FIG. 5, the location identifier for the closest processor node having failed access, processor node MCC-1 111, is "25", indicating that it is a communication processor node, and "01", indicating that it is located in the base frame 11.

If, instead, the configuration of FIG. 2 were employed, and the access testing was conducted by processor node 170, and the access testing detected failed access to both processor node 172, and 173, step 430 of FIG. 7 indicates that processor nodes XYC-A 172 and processor node ACC-A 173 have priorities listed in column 328 of the table of relative locations 320 of FIG. 6. Hence, in step 437, the processor 180 stores the location identifier from its table 190, which is table 320, for the higher priority processor node ACC-A 173, which is "27", indicating that it is an accessor processor node, and "01", indicating that it is located in the base frame 11.

Referring again to the network of FIG. 1, in step 440, the identifier of the closest processor node having failed access is posted at the local error indicator, for example, processor 122 of FIG. 1 posts the identifier at associated local error indicator 152, which, in the above example, is identifier "02", the location identifier from table 300 of FIG. 4 for processor node MCC-1 111.

Still referring to FIG. 7, as one option, the process ends at step 441 so that the user may examine the local error indicator 152 for the identifier. Should the same error occur at a subsequent access test, the same identifier is posted. Thus, the user, by examining the local error indicators of the processor nodes, may isolate failures in the distributed processing system without a requirement for external diagnostics.

As an example, referring additionally to FIG. 1, upon a failure of access between processor node 111 and processor node 112, such that neither processor node 110 nor processor node 111 are able to access any of processor nodes 112–118, both processor node 110 and processor node 111 provides the identifier of the closest processor node having failed access, which is processor node ACC-A 112. In the example of the table 310 of FIG. 5, this comprises the identifier "27-01". Similarly, processor nodes 112–118 are unable to access either of processor nodes 111–110, and all of the processor nodes 112–118 provide the identifier of the closest processor node having failed access, which is processor node MCC-1 111. In the example of the table 310 of FIG. 5, this comprises the identifier "25-01". An examination of the local error indicators thus quickly allows a user to isolate the failure to a point between processor node 111 and processor node 112.

As another example, upon a failure of access at processor node 112, such that none of processor nodes 110, 111 nor processor nodes 113–118 are able to access processor node 112, all of the processor nodes 110, 111, and 113–118 will indicate that the failure of access is at the closest processor node having failed access, which is processor node ACC-A 112, and employing the identifier of table 300 of FIG. 4, is "03". Processor node 112 is unable to access any of the other processor nodes 110, 111, and 113–118, and therefore indicates the special identifier "80". Again, an examination of the local error indicators quickly allows a user to isolate the failure to processor node 112.

In the alternative arrangement of a multi-drop bus network 160 of FIG. 2, in which processor nodes 170–172 are at an equal location and in which the drops for processor nodes 172 and 173 are tiered or cascaded, providing multiple processor nodes, the selection of the identifier when one of the multiple processor nodes is the closest failing processor node comprises selecting the multiple processor node 173 having the higher priority, and allowing a user to quickly isolate the failed access.

Still referring to FIG. 7, as another option, to capture and preserve error information of detected intermittent access failures, in step 443, an error message is posted to a log set up by the processor, e.g., processor 122 of FIG. 1, in the memory as provided by the code, e.g., test code 132. Subsequently, in step 445, the posted error message(s) may be accumulated at one or more central error logs. As an example, each processor has an error log for accumulating the error messages, or alternatively a single processor, for example, the processor 122 of processor node ACC-A 112 of FIG. 1, is provided with the capability of a central error log, e.g., in the memory as provided by test code 132. The detected access failures, including intermittent failures, are thus accumulated in the error log so that they may be examined at a suitable time. Thus, the error information is preserved which allows the user to isolate one or more intermittent failures.

As still another option, in step 450, the identifier of the closest processor node having failed access is locked at the error indicator, preserving information of the detected failure, which may also be a single intermittent failure. As one alternative, in step 453, the posted identifier is locked at the error indicator for a predetermined time-out period, controlled by a timer which is started when the identifier is posted. Upon expiration of the time-out period of the timer, the processor deletes the posted identifier from the error indicator. As an example, the timer comprises part of the code 132 of processor node 112 of FIG. 1.

As another alternative, the system comprises an operator input, for example, operator input 23 at operator panel processor node 113 of FIG. 3. A processor, having locked the posted identifier at the local error indicator in step 450, responds to an operator initiated signal at the operator input, in step 455, deleting the posted identifier from the local error indicator. Thus, after isolating the access failure, the user provides the operator initiated signal, and the identifiers at the local error indicators are deleted.

As a further alternative, the local error indicator in step 450, in step 457, is reset locally. As one example, the associated processor retests the network, and, if no error occurs during a predetermined number of retest cycles, e.g., 100, the associated processor deletes the identifier at the local error indicator. The retesting may be conducted as soon as the identifier is locked in step 450 to prevent posting of a transient problem, and/or the retesing may be conducted in response to an operator signal of step 455.

As another example, an operator or technician may actuate a manual reset input at the displaying processor node, deleting the posted identifier from the local error indicator. As an example, a manual reset input is provided at each of the error indicators 150–156 in FIG. 1. Alternatively, the error indicator may reside in volatile memory such that a card reset causes the error indicator to be cleared. The reset may occur from a power on reset or another input trigger or after communication input is restored.

As the result, a user is able to examine the local error indicators and isolate the access failure, and to conduct repairs without a requirement for external diagnostics. Further, information is preserved allowing the user to isolate and repair intermittent failures. Still further, error messages accumulated from the plurality of processor nodes at a central error log allow a user to analyze the error information and isolate and repair multiple intermittent failures.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a distributed processing system comprising processor nodes coupled by a multi-drop bus network, a method for isolating failures, comprising the steps of:

at least a plurality of said processor nodes each having information of relative locations of said processor nodes on said multi-drop bus network;

said plurality of processor nodes each independently testing access to at least one other of said processor nodes on said multi-drop bus network;

upon said access testing by any of said plurality of testing processor nodes detecting a failure to access at least one of said other said processor nodes, said failure detecting processor node determining, from said information of relative locations, the processor node having failed access which is closest to said failure detecting processor node; and said failure detecting processor node storing an identification of said closest processor node having failed access.

2. The method of claim 1, additionally comprising the step of:

posting an identifier of said closest processor node having failed access at an associated error indicator local to said failure detecting processor node.

3. The method of claim 2, additionally comprising the step of:

upon said access testing by any of said plurality of testing processor nodes detecting a failure to access all of said other processor nodes, said failure detecting processor node posting a special identifier at said associated local error indicator.

4. The method of claim 2, additionally comprising the steps of:

locking said posted identifier at said error indicator for a predetermined time-out period; and subsequent to expiration of said time-out period, deleting said posted identifier from said associated local error indicator.

5. The method of claim 2, additionally comprising the steps of:

locking said posted identifier at said error indicator; and responding to an operator initiated signal, deleting said posted identifier from said associated local error indicator.

6. The method of claim 2, additionally comprising the steps of;

locking said posted identifier at said associated local error indicator; and said displaying processor node retesting said access, and, upon absence of an error during a predetermined number of said retests, deleting said posted identifier from said associated local error indicator.

7. The method of claim 1, additionally comprising the step of:

posting an error message representing said identifier to an error log; and subsequently accumulating said posted error messages of said plurality of processor nodes.

8. The method of claim 1, wherein said multi-drop bus network additionally comprises multiple processor nodes extending from a single drop of said multi-drop bus network, upon said access failure detecting step detecting access failure of a plurality of said multiple processor nodes at said single drop, said step of determining said processor node having failed access additionally comprises determining, from said information of relative locations, said single drop having failed access which is closest to said failure detecting processor node, and selecting one of said multiple processor nodes at said single drop, said failure detecting processor node storing an identification of said selected processor node.

9. The method of claim 8, wherein one of said multiple processor nodes extending from said single drop of said multi-drop bus network is identified as having a higher priority than other processor nodes extending from said single drop, and wherein said selecting step comprises selecting said multiple processor node having said higher priority.

10. A distributed processing system comprising:
a multi-drop bus network;
processor nodes coupled by said multi-drop bus network, each of a plurality of said processor nodes having information providing relative locations of said processor nodes on said multi-drop bus network; said plurality of processor nodes each independently testing access to at least one other of said processor nodes on said multi-drop bus network; upon said access testing by any of said plurality of testing processor nodes detecting a failure to access at least one of said other said processor nodes, said failure detecting processor node determining, from said information of relative locations, the processor node having failed access which is closest to said failure detecting processor node, and storing an identification of said closest processor node having tailed access.

11. The distributed processing system of claim 10, additionally comprising a local error indicator associated with at least one of said plurality of processor nodes, said failure detecting processor node posting, at said local error indicator associated with said failure detecting processor node, an identifier of said closest processor node having failed access.

12. The distributed processing system of claim 11, wherein said plurality of processor nodes, additionally, upon said access testing by any of said plurality of testing processor nodes detecting a failure to access all of said other processor nodes, said failure detecting processor node posting a special identifier at said associated local error indicator.

13. The distributed processing system of claim 11, wherein at least one of said plurality of processor nodes additionally comprises a timer; and, upon detecting said access failure, locks said posted identifier at said associated local error indicator and starts said timer to time a predetermined time-out period; and responds to expiration of said time-out period of said timer, deleting said posted identifier from said local error indicator.

14. The distributed processing system of claim 11, additionally comprising an operator input; and wherein at least one of said plurality of processor nodes, additionally, upon detecting said access failure, locks said posted identifier at said associated local error indicator; and responds to an operator initiated signal at said operator input, deleting said posted identifier from said associated local error indicator.

15. The distributed processing system of claim 11, wherein at least one of said plurality of processor nodes additionally, upon detecting said access failure, locks said posted identifier at said associated local error indicator; and said displaying processor node retesting said access, and, upon absence of an error during a predetermined number of said retests, deleting said posted identifier from said local error indicator.

16. The distributed processing system of claim 11, wherein said local error indicators comprise character displays of at least one character.

17. The distributed processing system of claim 10, wherein each of said plurality of processor nodes additionally comprises an error log, and, upon detecting said access failure, posts an error message representing said identifier to said error log.

18. The distributed processing system of claim 10, additionally comprising multiple ones of said processor nodes extending from a single drop of said multi-drop bus network; wherein said information of relative locations of said plurality of processor nodes, additionally provides information of said processor nodes at said single drop; wherein each said failure detecting processor node additionally, upon detecting access failure of a plurality of said multiple processor nodes at said single drop, determines from said information of relative locations, said single drop having failed accesses which is closest to said failure detecting processor node, and selects one of said multiple processor nodes at said single drop, said failure detecting processor node storing an identification of said selected processor node.

19. The distributed processing system of claim 18, wherein one of said multiple processor nodes extending from said single drop of said multi-drop bus network is identified in said information of relative locations as having a higher priority than other processor nodes extending from said single drop; and wherein each of said plurality of processor nodes additionally, upon detecting said access failure at said single drop, determines from said information of relative locations, said higher priority processor node, and selects and stores an identification of said multiple processor node having said higher priority.

20. A processor node of a distributed processing system, said distributed processing system comprising processor nodes coupled by a multi-drop bus network, said processor node comprising:
an information table providing relative locations of said processor nodes on said multi-drop bus network; and
a processor independently testing access to other said processor nodes on said multi-drop bus network; upon said access testing detecting a failure to access at least one of said other processor nodes, determining, from said information table of relative locations, the processor node having failed access which is closest to said failure detecting processor node, and storing an identification of said closest processor node having failed access.

21. The processor mode of claim 20, additionally comprising a local error indicator associated with said processor of said failure detecting processor, said processor node posting, at said associated local error indicator, an identifier of said closest processor node having failed access.

22. The processor node of claim 21, additionally, upon said access testing detecting a failure to access all of said other processor nodes, said failure detecting processor node posting a special identifier at said associated local error indicator.

23. The processor node of claim 21, additionally comprising a timer; and wherein said processor, upon detecting said access failure, locks said posted identifier at said associated local error indicator and starts said timer to time a predetermined time-out period; and responds to expiration of said time-out period of said timer, deleting said posted identifier from said associated local error indicator.

24. The processor node of claim 21, wherein said processor, additionally, upon detecting said access failure, locks said posted identifier at said associated local error indicator; and responds to an operator initiated signal at an operator input, deleting said posted identifier from said associated local error indicator.

25. The processor node of claim 21, additionally, said processor, upon detecting said access failure, locks said posted identifier at said associated local error indicator; and retests said access, and, upon absence of an error during a predetermined number of said retests, deleting said posted identifier from said associated local error indicator.

26. The processor node of claim 21, wherein said associated local error indicator comprises a character display of at least one character.

27. The processor node of claim 20, additionally comprising an error log, and wherein said processor, upon detecting said access failure, posts an error message representing said identifier to said error log.

28. The processor node of claim 20, wherein said multi-drop bus network comprises multiple processor nodes extending from a single drop of said multi-drop bus network; wherein said information table of relative locations of said processor node additionally provides said processor nodes at said single drop; wherein said processor additionally, upon detecting access failure of a plurality of said multiple processor nodes at said single drop, determines from said information table of relative locations, said single drop having failed access which is closest to said failure detecting processor node, selects one of said multiple processor nodes at said single drop, and stores an identification of said selected processor node.

29. The processor node of claim 28, wherein one of said multiple processor nodes extending from said single drop of said multi-drop bus network is identified in said information table of relative locations as having a higher priority than other processor nodes extending from said single drop; and wherein said processor additionally, upon detecting said access failures at said single drop, determines from said information table of relative locations, said higher priority processor node, and selects and stores an identification of said multiple processor node having said higher priority.

30. A computer program product of a computer readable medium usable with a programmable computer, said computer program product having computer readable program code embodied therein for isolating failures of a multi-drop bus network in a distributed processing system, said distributed processing system comprising processor nodes coupled by said multi-drop bus network, comprising:

computer readable program code which causes a computer processor of at least one of a plurality of said processor nodes to store information of relative locations of said processor nodes on said multi-drop bus network;

computer readable program code which causes said computer processor to test, independently of other of said processor nodes, access to at least one other of said processor nodes on said multi-drop bus network;

computer readable program code which causes said computer processor, upon said access testing detecting a failure to access at least one of said other processor nodes, to determine, from said provided information of relative locations, the processor node having failed access which is closest to said failure detecting processor node; and computer readable program code which causes said computer processor to store an identification of said closest processor node having failed access.

31. The computer program product of claim 30, additionally comprising computer readable program code which causes said computer processor to post, at a local error indicator associated with said failure detecting processor node, an identifier of said closest processor node having failed access.

32. The computer program product of claim 31, additionally comprising computer readable program code which causes said computer processor, upon said access testing detecting a failure to access all of said other processor nodes, to post a special identifier at said associated local error indicator.

33. The computer program product of claim 31, additionally comprising computer readable program code which causes said computer processor to provide a timer, and which causes said computer processor, upon detecting said access failure, to lock said posted identifier at said associated local error indicator and start said timer to time a predetermined time-out period, and to respond to expiration of said time-out period of said timer, deleting said posted identifier from said associated local error indicator.

34. The computer program product of claim 31, wherein said computer readable program code additionally causes said computer processor, upon detecting said access failure, to lock said posted identifier at said associated local error indicator, and to respond to an operator initiated signal at an operator input, deleting said posted identifier from said associated local error indicator.

35. The computer program product of claim 31, wherein said computer readable program code additionally causes said computer processor, upon detecting said access failure, to lock said posted identifier at said associated local error indicator, and to retest said access, and upon absence of an error during a predetermined number of said retests, to delete said posted identifier from said associated local error indicator.

36. The computer program product of claim 30, additionally comprising computer readable program code which causes said computer processor to provide an error log, and which causes said computer processor, upon detecting said access failure, to post an error message representing said identifier to said error log.

37. The computer program product of claim 30, wherein said multi-drop bus network comprises multiple processor nodes extending from a single drop of said multi-drop bus network; and wherein said computer readable program code additionally causes said computer processor to provide said information of relative locations of said processor nodes to additionally provide information of said processor nodes at said single drop; and wherein said computer readable program code additionally causes said computer processor, upon detecting access failure of a plurality of said multiple processor nodes at said single drop, to determine from said information of relative locations, said single drop having failed access which is closest to said failure detecting processor node, to select one of said multiple processor nodes at said single drop, and to store an identification of said selected processor node.

38. The computer program product of claim 37, wherein said computer readable program code additionally causes said computer processor to identify, in said provided information of relative locations, one of said multiple processor nodes extending from said single drop of said multi-drop bus network as having a higher priority than other processor nodes extending from said single drop; and wherein said computer readable program code additionally causes said computer processor, upon detecting said access failures at said single drop, to determine from said information of relative locations, said higher priority processor node, and to select an identification of said multiple processor node having said higher priority.

39. An automated data storage library having a distributed control system, said automated data storage library accessing data storage cartridges in response to received commands, comprising:

a multi-drop bus network;

at least one communication processor node for receiving commands, and coupled to said multi-drop bus network to provide a communication link for said commands;

a robot accessor having a gripper and servo motors for accessing said data storage cartridges, said robot accessor having at least one processor node coupled to said multi-drop bus network for operating said gripper and said servo motors in response to said linked commands;

each of said processor nodes having information of relative locations of processor nodes on said multi-drop bus network; said processor nodes each independently testing access to other said processor nodes on said multi-drop bus network; upon said access testing by any of said testing processor nodes detecting a failure to access at least one of said other processor nodes, said failure detecting processor node determining, from said information of relative locations, the processor node having failed access which is closest to said failure detecting processor node; and said failure detecting processor node storing an identification of said closest processor node having failed access.

40. The automated data storage library of claim 39, additionally comprising a plurality of local error indicators, each uniquely associated with at least one of said processor nodes, and wherein said failure detecting processor node additionally posts, at said local error indicator associated with said failure detecting processor node, an identification of said closest processor node having failed access.

41. The automated data storage library of claim 40, wherein said processor nodes, additionally, upon said access testing by any of said testing processor nodes detecting a failure to access all of said other processor nodes, said failure detecting processor node posting a special identifier at said associated local error indicator.

42. The automated data storage library of claim 40, wherein at least one of said processor nodes additionally comprises a timer; and, upon detecting said access failure, locks said posted identifier at said associated local error indicator and starts said timer to time a predetermined time-out period; and responds to expiration of said time-out period of said timer, deleting said posted identifier from said associated local error indicator.

43. The automated data storage library of claim 40, additionally comprising an operator panel comprising an operator panel processor node and an operator input; and wherein at least one of said processor nodes, additionally, upon detecting said access failure, locks said posted identifier at said associated local error indicator; and responds to an operator initiated signal at said operator input, deleting said posted identifier from said associated local error indicator.

44. The automated data storage library of claim 40, wherein at least one of said processor nodes additionally, upon detecting said access failure, locks said posted identifier at said associated local error indicator; and said displaying processor node retesting said access, and, upon absence of an error during a predetermined number of said retests, deleting said posted identifier from said associated local error indicator.

45. The automated data storage library of claim 40, wherein said local error indicators comprise character displays of at least one character.

46. The automated data storage library of claim 39, wherein each of said processor nodes additionally comprises an error log, and, upon detecting said access failure, posts an error message representing said identifier to said error log.

47. The automated data storage library of claim 39, additionally comprising multiple ones of said processor nodes extending from a single drop of said multi-drop bus network; wherein said provided information of relative locations of said plurality of processor nodes additionally determining said processor nodes at said single drop; wherein each of said processor nodes additionally, upon detecting access failure of a plurality of said multiple processor nodes at said single drop, determines from said information of relative locations, said single drop having failed access which is closest to said failure detecting processor node, and selects one of said multiple processor nodes at said single drop, said failure detecting processor node storing an identification of said selected processor node.

48. The automated data storage library of claim 47, wherein one of said multiple processor nodes extending from said single drop of said multi-drop bus network is identified in said provided information of relative locations as having a higher priority than other processor nodes extending from said single drop; and wherein each of said plurality of processor nodes additionally, upon detecting said access failures at said single drop, determines from said information of relative locations, said higher priority processor node, and selects and stores an identification of said multiple processor node having said higher priority.

49. The automated data storage library of claim 39, additionally comprising a plurality of interconnected frames, each having a plurality of said storage shelves, at least one of said frames coupling said at least one robot accessor processor node with said multi-drop bus network, at least one of said frames coupling said at least one communication processor node with said multi-drop bus network, said processor nodes in each of said frame comprising at least one said relative location.

* * * * *